(No Model.) 2 Sheets—Sheet 1.
T. B. MONTGOMERY.
REVERSIBLE OVERLAP DISK HARROW.
No. 525,960. Patented Sept. 11, 1894.
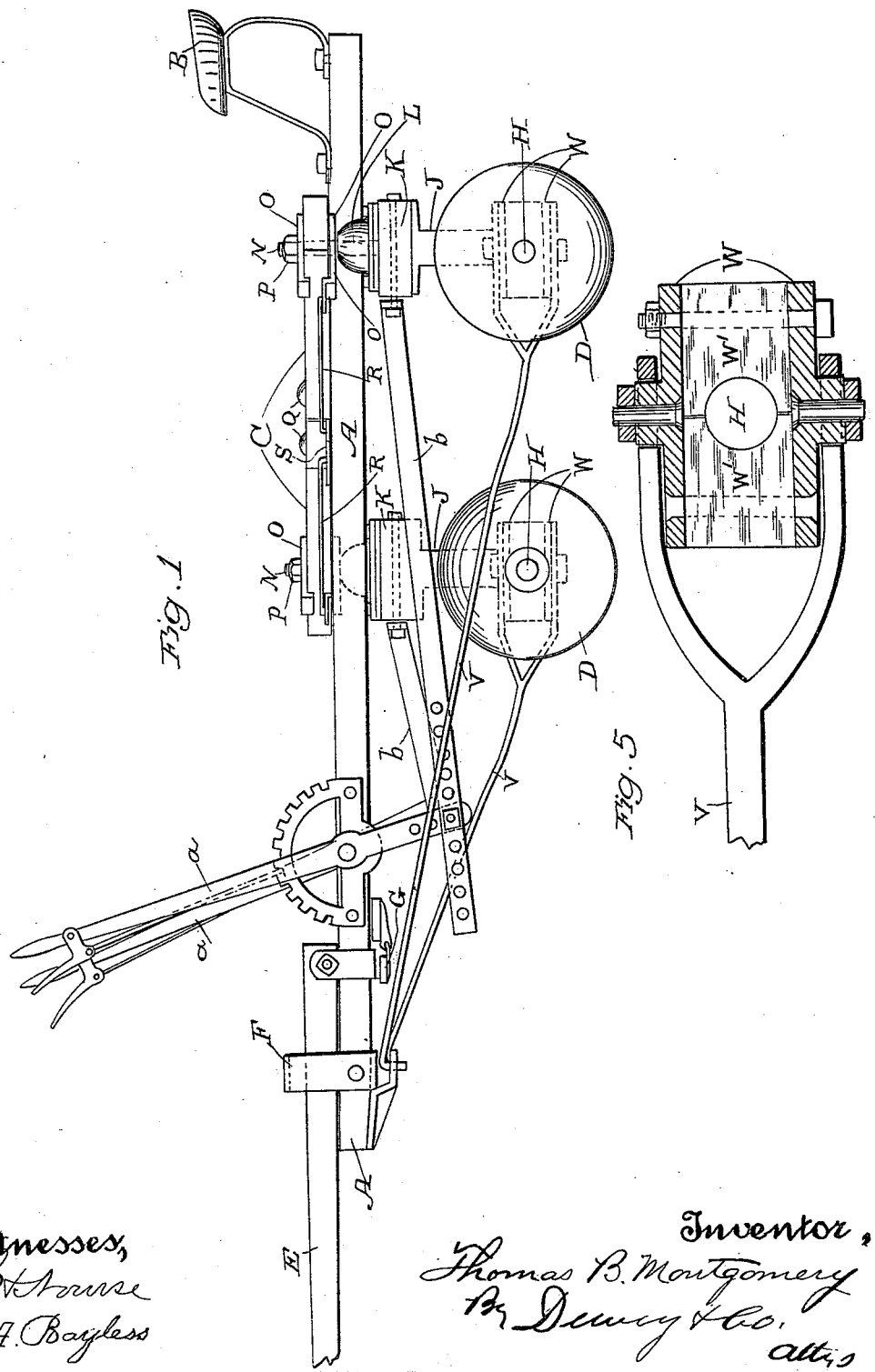
Witnesses,
J. H. Howse
J. A. Bayless
Inventor,
Thomas B. Montgomery
By Dewey & Co.
Att'ys (No Model.) 2 Sheets—Sheet 2.
T. B. MONTGOMERY.
REVERSIBLE OVERLAP DISK HARROW.
No. 525,960. Patented Sept. 11, 1894.
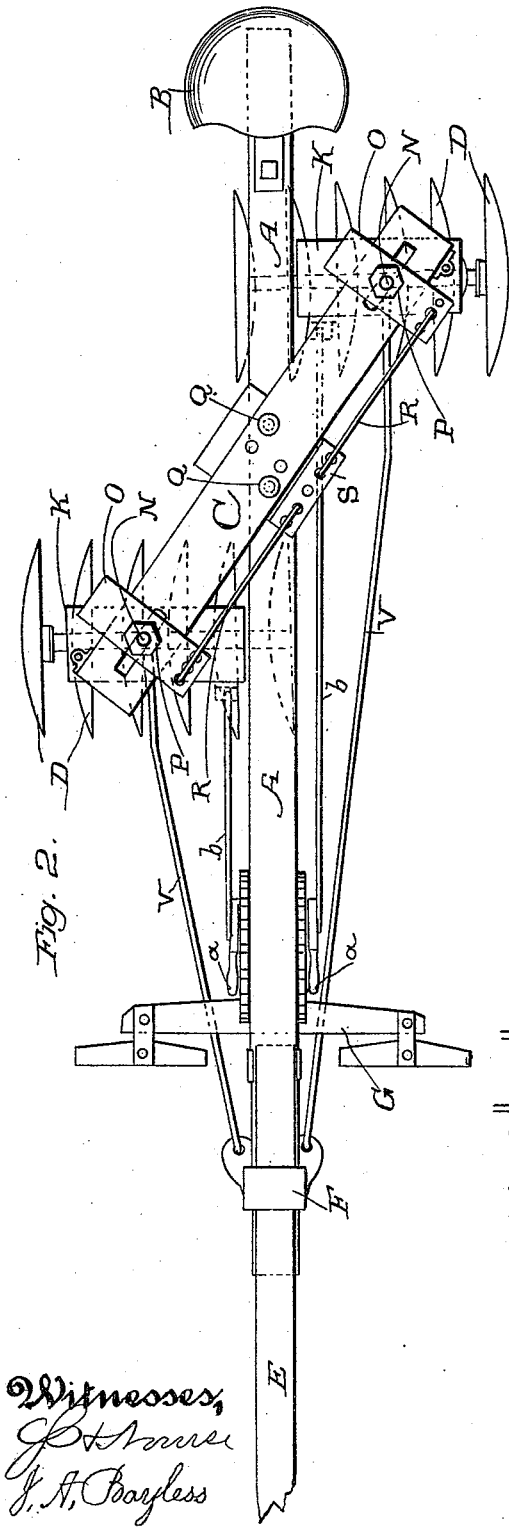
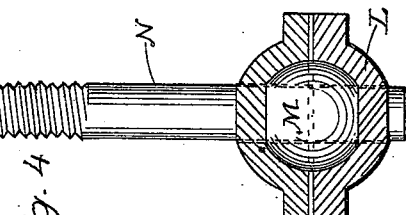
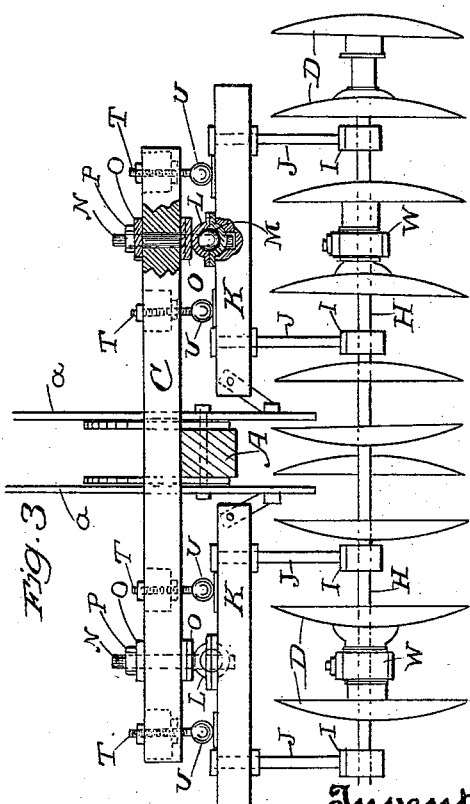
Witnesses:
Inventor,
Thomas B. Montgomery
By Dewey & Co.
Attys

UNITED STATES PATENT OFFICE.

THOMAS B. MONTGOMERY, OF BENICIA, CALIFORNIA, ASSIGNOR TO THE BENICIA AGRICULTURAL WORKS, OF SAME PLACE.

REVERSIBLE OVERLAP-DISK HARROW.

SPECIFICATION forming part of Letters Patent No. 525,960, dated September 11, 1894.

Application filed April 27, 1894. Serial No. 509,241. (No model.)

*To all whom it may concern:*

Be it known that I, THOMAS B. MONTGOMERY, a citizen of the United States, residing at Benicia, Solano county, State of California, have invented an Improvement in Reversible Overlap-Disk Harrows; and I hereby declare the following to be a full, clear, and exact description of the same.

My invention relates to improvements in that class of land tilling implements, known as disk harrows, in which a series of saucer shaped disks are mounted upon shafts carried upon a main frame, so that the edges of the disks act to dig up and cultivate the soil.

My invention consists in details of construction which will be more fully explained by reference to the accompanying drawings, in which—

Figure 1 is a side view of my invention. Fig. 2 is a plan view. Fig. 3 is a front view showing a section of parts of the machine. Fig. 4 is a view of the turning shaft and box. Fig. 5 is a section of one of the draft bar boxes.

The main frame of the apparatus consists of a longitudinal beam A, upon the rear end of which is mounted a seat B for the driver.

C is a beam fixed across the beam A and adapted to carry the two sets of disks D upon opposite sides of the beam, and the mechanism by which they are supported and adjusted.

The front end of the beam A has the draft pole or tongue E hinged to it at a point a short distance behind the front end, and a yoke or band F clasps the pole loosely, the yoke having its ends secured to the front end of the beam A so that the upper part of the yoke stands at some distance above the top of the pole, and the latter is thus allowed to swivel about its fulcrum point with but little change of position, while the front of the harrow beam is allowed to rise and fall and adjust itself to irregularities of the surface without transmitting the movement to the team through the pole.

G is the double-tree fulcrumed to the beam A with the usual attachments for the team upon each side of the pole.

The disks D, composing each of the harrow sections, are mounted upon shafts H, and these shafts turn in journal-boxes I fixed to the lower ends of standards J, the upper ends of which are suitably bolted or secured to the short beams K. At the center of these beams are fixed boxes L, the interior of which is made globular, or of other suitable shape to receive the enlargement M upon the vertical turning shaft N. This shaft extends down through the top of the box L, the enlargement M fitting the interior of the box, and the shaft having an extension below the enlargement which passes down through the bottom of the box L, and turns in the hole made for it in the top of the beam K. This serves to steady the beam K while allowing it to swivel around upon the shaft when it is desired to turn the harrows at any desired angle or to reverse them altogether.

The upper end of the spindle N passes up through a slot or opening made lengthwise in the beam C, and also through plates O fixed above and below the beam C, and by means of a nut P, the spindle and box are drawn up tight against the beam and held rigidly in place.

In order to steady and support the shank N and prevent the nut from being loosened, and the parts moving, I have shown the brace rods R having the ends bent at right angles, and the inner ends adapted to fit into holes in the plate S fixed centrally to the beam C, while the outer ends hook into corresponding holes in the bottom plates O through which the stem or spindle passes.

The beam C is adapted to stand either diagonally, as shown in Fig. 2, or it may extend at right angles with the beam A, to which it is secured by bolts Q passing through holes in the two beams. Two of the holes for the bolts Q are made directly in line transversely across the beam C so that the beam may be attached at right angles to A by passing the bolts through these holes. The other two holes are made on a diagonal line in the beam C, and when the bolts are passed through these holes and the corresponding holes in the beam A, the beam C will stand in a diagonal position as illustrated in full lines in Fig. 2. In this position, the inner disks of the two parts of the harrow overlap each other a distance covered by one or two of the disks, so that the soil will be cultivated the entire width of the harrow, and no ridges or depressions will be left between the inner disks, which, as they are set to throw the dirt in opposite directions, would otherwise be the case.

The forward set of disks will throw the dirt either outward or inward, according to the position in which the disks are set, and the rearmost disks throwing the dirt in the opposite direction to counterbalance the draft of the forward ones, overlap the track of the forward disks sufficiently to practically cultivate and level all the earth.

By means of the slots in the transverse beam C, the frames K and their attached disks may be adjusted to or from the beam A so as to increase or decrease the amount of overlap.

Through the outer ends of the beam C pass the screw stems T secured firmly therein by lock nuts above and below the beam, and having at the lower end the ball bearing or contact ends U which are so adjusted as to rest upon the tops of the beams K and thus steady them, and prevent tilting or wabbling motion when the disks are passing through the ground.

The draft for the harrows is made centrally upon the axle H by means of draft rods V, the forward ends of which are attached to the front of the beam A, as shown, and the rear ends are forked so as to attach centrally to the top and bottom of the boxes W. These boxes consist of top and bottom iron plates within which are contained the wooden jaws W′. These jaws are made in two parts, separated vertically at the center, and may be pushed in from either end between the plates W, and afterward secured by bolts passing through them.

The swivel connection of the forks at the rear of the draft rods V, is in vertical line through the center of the shaft, and in line with the swivel stem N, while the draft takes place directly from the axle instead of from some point at a distance in front of it.

By reason of the removable jaws W′, it is only necessary when it is desired to reverse the disks, to throw either outward or inward, to remove the rear jaw W′ when the box and draft rod can be disengaged from the axle, and the beam K and the disks turned entirely around, after which the box is replaced and connection again made.

The adjustment of the disks in their line of travel is effected by means of levers a and connecting rods b which extend back from the levers and are connected with the inner ends of the beams K.

Whenever the beams K and the disks are reversed, it is necessary to disengage these connecting rods as well as the draft rods V, and the disks, and their shafts may be turned around so that the disks face in the opposite direction from that previously occupied. The rods are then connected with the opposite end which is now at the inside.

By these improvements I am enabled to make an interchangeable, overlap, or straight-way, disk harrow, reversible so as to make an in-throw or out-throw.

Having thus described my invention, what I claim as new, and desire to secure by Letters Patent, is—

1. A disk harrow consisting of a main longitudinal beam, a transverse beam adapted to bolt thereto either at right angles or diagonally, and having adjusting slots in its outer ends, disks supported upon axles, the journal boxes of which are attached to independent beams, vertical spindles having a ball-and-socket connection with the independent beam and extending up through the slots in the outer ends of the main frame, and means for adjusting the spindles.

2. A harrow consisting of the concavo-convex disks fixed upon shafts, beams to which the journal-boxes of said shafts are attached, a swivel connection between these beams and a main fixed frame consisting of boxes having ball or other shaped enlarged chambers and spindles passing through said chambers having corresponding enlargements to fit them, said spindles having the upper ends passing through and adjustably fixed in slotted ends of the main frame, and the lower ends extending into the tops of the harrow beams.

3. A harrow consisting of the concavo-convex disks mounted in series upon two independent axles, beams to which the journal-boxes of each of said axles are connected, a main draft beam, and a supplemental beam extending diagonally upon opposite sides of the longitudinal beam and tongue, and an adjustable ball and socket connection between the harrow beams and the diagonal beam, whereby the two disk carrying shafts overlap, one behind the other at the inner ends.

4. A harrow consisting of two series of disks mounted upon separate shafts journaled from beams which are turnable about a vertical axis with relation to the main draft frame, draft bars having the front ends connected with the draft frame and the rear ends forked, draft boxes upon the disk shafts adapted to be clasped by said forked ends of the draft bars, and jaws of wood adapted to be inserted between the plates from either end, and separable in the vertical plane through the axis of the shafts, and bolts for securing the jaws in place.

5. A harrow consisting of concavo-convex disks fixed in two series upon independent shafts, journal-boxes in which said shafts turn, and a beam from which said boxes are supported, a main draft beam and a supplemental beam adapted to be fixed at right angles or diagonally thereto, having the outer ends slotted, ball and socket connections between this supplemental beam and the beam from which the disk shafts are supported, whereby the shafts may be made to stand in line with each other, or one behind the other, with the inner ends overlapping as described.

6. The concavo-convex disks fixed in series to two independent shafts, the journal-boxes in which said shafts turn, and beams from which said journal-boxes are supported a main draft beam and a transverse supplemental beam adapted to be secured thereto at right angles or diagonally, slots made longitudinally and vertically in the end of said beam, a swivel ball and socket connection between the shaft box supporting beam and the transverse supplemental beam, and screw stems adjustable vertically in the ends of the supplemental beam, with ball pressure plates adapted to rest upon the harrow beams as described.

In witness whereof I have hereunto set my hand.

THOMAS B. MONTGOMERY.

Witnesses:
 JAS. A. MALONE,
 W. L. CROOKS.